(12) United States Patent
Ogata

(10) Patent No.: US 11,201,016 B2
(45) Date of Patent: Dec. 14, 2021

(54) ELECTROLYTIC CAPACITOR

(71) Applicant: Panasonic Intellectual Property Management Co., Ltd., Osaka (JP)

(72) Inventor: Norihiko Ogata, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 13 days.

(21) Appl. No.: 16/801,444

(22) Filed: Feb. 26, 2020

(65) Prior Publication Data

US 2020/0194185 A1 Jun. 18, 2020

Related U.S. Application Data

(63) Continuation of application No. PCT/JP2018/032304, filed on Aug. 31, 2018.

(30) Foreign Application Priority Data

Sep. 29, 2017 (JP) .............................. JP2017-191951

(51) Int. Cl.
*H01G 9/012* (2006.01)
*H01G 9/042* (2006.01)
*H01G 9/15* (2006.01)

(52) U.S. Cl.
CPC ........... *H01G 9/012* (2013.01); *H01G 9/0425* (2013.01); *H01G 9/15* (2013.01)

(58) Field of Classification Search
None
See application file for complete search history.

(56) References Cited

U.S. PATENT DOCUMENTS

| 6,519,135 B2* | 2/2003 | Sano | H01G 9/012 |
| | | | 361/510 |
| 6,751,086 B2* | 6/2004 | Matsumoto | H01G 9/012 |
| | | | 361/508 |

(Continued)

FOREIGN PATENT DOCUMENTS

| JP | 7-142667 | 6/1995 |
| JP | 8-022932 | 1/1996 |

(Continued)

OTHER PUBLICATIONS

International Search Report of PCT application No. PCT/JP2018/032304 dated Nov. 13, 2018.

(Continued)

*Primary Examiner* — Dion Ferguson
(74) *Attorney, Agent, or Firm* — McDermott Will and Emery LLP

(57) ABSTRACT

An electrolytic capacitor includes a capacitor element, an anode lead terminal, a cathode lead terminal, and a resin outer package. The capacitor element includes an anode part and a cathode part. The anode lead terminal is electrically connected to the anode part. The cathode lead terminal is electrically connected to the cathode part, and has a first main surface and a second main surface opposite to the first main surface. The resin outer package covers the capacitor element. The cathode lead terminal includes a joint part to be joined with the cathode part. The joint part has a recess on the first main surface. In at least one cross-section cutting the recess an being perpendicular to the first main surface, a relation $D1 < D_{max}$ is satisfied, where D1 represents an opening width of a first opening at the first main surface of the recess, and $D_{max}$ represents a maximum width of the recess inside the recess.

6 Claims, 2 Drawing Sheets

(56) References Cited

U.S. PATENT DOCUMENTS

| | | | | |
|---|---|---|---|---|
| 2002/0167786 A1* | 11/2002 | Sano | ...................... | H01G 9/012 |
| | | | | 361/509 |
| 2003/0151884 A1* | 8/2003 | Matsumoto | .............. | H01G 9/15 |
| | | | | 361/523 |
| 2007/0242409 A1* | 10/2007 | Nakamura | ............. | H01G 9/012 |
| | | | | 361/272 |
| 2008/0037201 A1* | 2/2008 | Kuriyama | .............. | H01G 9/042 |
| | | | | 361/528 |

FOREIGN PATENT DOCUMENTS

| | | |
|---|---|---|
| JP | 2003-234251 | 8/2003 |
| JP | 2005-191178 | 7/2005 |
| JP | 2006-237195 | 9/2006 |

OTHER PUBLICATIONS

English Translation of Chinese Office Action dated Sep. 27, 2021 for the related Chinese Patent Application No. 201880062031.6.
"Wooden model structure and manufacturing analysis chairs (Partial English Translation)", attached in the Chinese Office Action dated Sep. 27, 2021 for the related Chinese Patent Application No. 201880062031.6.

\* cited by examiner

ELECTROLYTIC CAPACITOR

RELATED APPLICATIONS

This application is a continuation of the PCT International Application No. PCT/JP2018/032304 filed on Aug. 31, 2018, which claims the benefit of foreign priority of Japanese patent application No. 2017-191951 filed on Sep. 29, 2017, the contents all of which are incorporated herein by reference.

BACKGROUND

1. Technical Field

The present disclosure relates to an electrolytic capacitor, and in detail, suppression of interfacial peeling of a cathode lead terminal.

2. Description of the Related Art

Electrolytic capacitors are mounted to various electronic devices because of their lower equivalent series resistance (ESR) and excellent frequency characteristics. An electrolytic capacitor usually includes a capacitor element including an anode part and a cathode part, an anode lead terminal electrically connected to the anode part, a cathode lead terminal electrically connected to the cathode part, and a resin outer package covering the capacitor element.

One main surface of the cathode lead terminal is, for example, joined with the cathode part by a conductive adhesive material, and another main surface is in contact with the resin outer package. Unexamined Japanese Patent Publication No. 2006-237195 proposes that a groove or a recess is formed on both main surfaces of the cathode lead terminal.

SUMMARY

An electrolytic capacitor according to the present disclosure includes a capacitor element, an anode lead terminal, a cathode lead terminal, and a resin outer package. The capacitor element includes an anode part and a cathode part. The anode lead terminal is electrically connected to the anode part. The cathode lead terminal is electrically connected to the cathode part, and has a first main surface and a second main surface opposite to the first main surface. The resin outer package covers the capacitor element, and exposes at least a part of the anode lead terminal and at least a part of the cathode lead terminal. The cathode lead terminal includes a joint part to be joined with the cathode part. The joint part has a recess on the first main surface. In at least one cross-section cutting the recess and being perpendicular to the first main surface, a relation $D1 < D_{max}$ is satisfied, where $D1$ represents an opening width of a first opening at the first main surface of the recess, and $D_{max}$ represents a maximum width of the recess inside the recess.

According to the present disclosure, interfacial peeling between a cathode lead terminal and a cathode part, and interfacial peeling between the cathode lead terminal and a resin outer package can be suppressed. As a result, an increase in an ESR can be suppressed.

DETAILED DESCRIPTION OF EMBODIMENT

Figure 1:
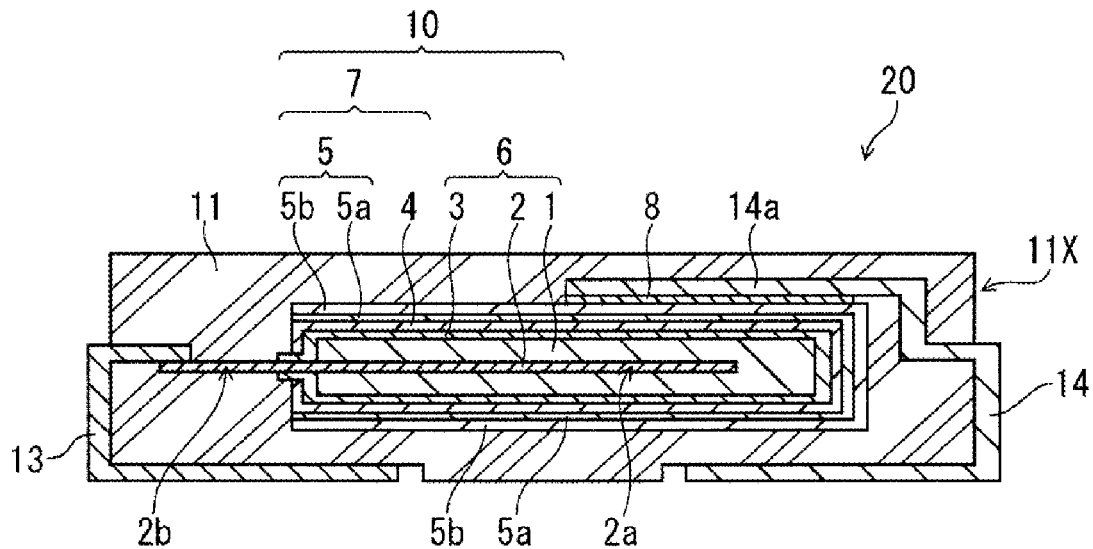
FIG. 1 is a sectional view schematically illustrating an electrolytic capacitor according to one exemplary embodiment of the present disclosure.

According to Unexamined Japanese Patent Publication No. 2006-237195, the groove or recess increases adhesion strength between the cathode lead terminal and the conductive adhesive material, and adhesion between the cathode lead terminal and the resin outer package. However, interfacial peeling between the cathode lead terminal, and the cathode part and the resin outer package cannot be sufficiently suppressed.

The electrolytic capacitor according to the present exemplary embodiment includes a capacitor element, an anode lead terminal, a cathode lead terminal, and a resin outer package. The capacitor element includes an anode part and a cathode part. The anode lead terminal is electrically connected to the anode part. The cathode lead terminal is electrically connected to the cathode part and has a first main surface and a second main surface opposite to the first main surface. The resin outer package covers the capacitor element and exposes at least a part of the anode lead terminal and at least a part of the cathode lead terminal.

The cathode lead terminal includes a joint part to be joined with the cathode part. On the first main surface in the joint part of the cathode lead terminal, a recess is formed. In at least one cross-section perpendicular to the first main surface, a relation $D1 < D_{max}$ is satisfied, where $D1$ represents an opening width of a first opening formed at the first main surface by the recess, and $D_{max}$ represents a maximum width of the recess inside the recess.

When the first main surface in the joint part of the cathode lead terminal faces the cathode part, the recess is disposed on a surface joined with the cathode part of the cathode lead terminal. In this way, a contact area between the cathode lead terminal and the cathode part increases. Moreover, since maximum width $D_{max}$ of the recess inside the recess is larger than opening width $D1$ of the first opening formed at the first main surface, a large anchor effect is obtained. As a result, interfacial peeling between the cathode lead terminal and the cathode part is further suppressed. Moreover, since a displacement of the cathode lead terminal is suppressed, interfacial peeling between the cathode lead terminal and the resin outer package is easily suppressed.

On the other hand, when the second main surface in the joint part of the cathode lead terminal faces the cathode part, the recess is disposed on a surface joined with the resin outer package of the cathode lead terminal. Even in this case, since the contact area between the cathode lead terminal and the resin outer package increases and a large anchor effect is obtained, the interfacial peeling between the cathode lead terminal and the resin outer package is further suppressed. Since the interfacial peeling between the cathode lead terminal and the resin outer package is suppressed particularly in the joint part, the adhesion between the cathode lead terminal and the cathode part is ensured. As a result, an increase in an ESR is effectively suppressed. Moreover, since the displacement of the cathode lead terminal is suppressed, the interfacial peeling between the cathode lead terminal and the cathode part is easily suppressed.

<Electrolytic Capacitor>

An example in which an electrolytic capacitor according to one exemplary embodiment of the present disclosure includes a solid electrolyte layer as an electrolyte is described with reference to FIG. 1, but is not limited to this example. FIG. 1 is a sectional view schematically illustrating electrolytic capacitor 20 according to the present exemplary embodiment. Note that in FIG. 1, for the sake of convenience, a recess is omitted.

Electrolytic capacitor 20 includes capacitor element 10 including anode part 6 and cathode part 7, resin outer package 11 that seals capacitor element 10, anode lead terminal 13 electrically connected to anode part 6 and partially exposed from resin outer package 11, and cathode lead terminal 14 electrically connected to cathode part 7 and partially exposed from resin outer package 11. Anode part 6 includes anode body 1 including dielectric layer 3 and anode wire 2. Cathode part 7 includes solid electrolyte layer 4 formed on dielectric layer 3 and cathode layer 5 covering a surface of solid electrolyte layer 4.

<Capacitor Element>

Capacitor element 10 according to the present exemplary embodiment is described in detail.

(Anode Part)

Anode part 6 includes anode body 1 and anode wire 2. Anode wire 2 extends from a surface of anode body 1 and is electrically connected to anode lead terminal 13.

For example, anode body 1 is a porous sintered body having a rectangular parallelepiped shape that is obtained through sintering of metal particles. Particles of valve metal such as titanium (Ti), tantalum (Ta), and niobium (Nb) are used as the metal particles described above. One kind or two or more kinds of metal particles are used for anode body 1. The metal particles may also be an alloy made of two or more metals. For example, a valve metal and an alloy including silicon, vanadium, boron or the like may be used. Alternatively, a compound including a valve metal and a typical element such as nitrogen may be used. The alloy of a valve metal includes the valve metal as a main component and includes, for example, the valve metal in an amount of 50 atom % or more.

Anode wire 2 is formed of a conductive material. The material of anode wire 2 is not particularly limited. Other than the valve metal described above, examples for the material of anode wire 2 include copper, aluminum, and an aluminum alloy. The material of anode body 1 and the material of anode wire 2 may be the same or different. Anode wire 2 includes first portion 2a, which is embedded in anode body 1 from one surface of anode body 1, and second portion 2b, which extends from the one surface of anode body 1. A cross-sectional shape of anode wire 2 is not particularly limited, and may be a circular shape, a track shape (a shape formed of straight lines parallel to each other and two curves that connect ends of these straight lines), an ellipse, a rectangular shape, and a polygon.

Anode part 6 is produced, for example, by being compression-molded into a rectangular parallelepiped shape while first portion 2a is embedded in powder of the metal particles described above, and sintered. In this way, second portion 2b of anode wire 2 is drawn out from one surface of anode body 1 so as to be planted. Second portion 2b is joined with anode lead terminal 13 by welding or the like, and anode wire 2 and anode lead terminal 13 are electrically connected to each other. A method for welding is not particularly limited, and may be resistance welding and laser welding.

Dielectric layer 3 is formed on a surface of anode body 1. For example, dielectric layer 3 is made of metal oxide. For example, a method for immersing anode body 1 in an anodization solution to anodize the surface of anode body 1, and a method for heating anode body 1 under an atmosphere containing oxygen can be exemplified as a method for forming a metal-oxide-containing layer on the surface of anode body 1. Dielectric layer 3 is not limited to a layer including the metal oxide described above, and has only to have insulation properties.

(Cathode Part)

Cathode part 7 includes solid electrolyte layer 4 formed on dielectric layer 3 and cathode layer 5 covering solid electrolyte layer 4.

Solid electrolyte layer 4 has only to be formed so as to cover at least a part of dielectric layer 3. Examples of solid electrolyte layer 4 include a manganese compound and a conductive polymer. Examples of the conductive polymer include polypyrrole, polythiophene, polyfuran, polyaniline, polyacetylene, polyphenylene, polyparaphenylene vinylene, polyacene, polythiophene vinylene, polyfluorene, polyvinylcarbazole, polyvinyl phenol, polypyridine, or derivatives of these polymers. These polymers may be used alone or in combination of a plurality of polymers. Alternatively, the conductive polymer may be a copolymer of two or more kinds of monomers. The conductive polymer may be polythiophene, polyaniline, or polypyrrole in terms of superiority in electric conductivity. In particular, polypyrrole is preferable as the conductive polymer in terms of superiority in water-repellency.

Solid electrolyte layer 4 including the conductive polymer described above is formed through, for example, polymerization of a raw material monomer on dielectric layer 3. Alternatively, solid electrolyte layer 4 is formed through application, to dielectric layer 3, of liquid containing the conductive polymer described above. Solid electrolyte layer 4 is constituted by one layer or two or more layers of a solid electrolyte layer. When solid electrolyte layer 4 is constituted by two or more layers, a composition, a forming method (polymerization method), or the like of the conductive polymer used for each layer may be different from each other.

In the present specification, polypyrrole, polythiophene, polyfuran, polyaniline, and the like mean polymers having, as a basic skeleton, polypyrrole, polythiophene, polyfuran, polyaniline, and the like, respectively. Consequently, polypyrrole, polythiophene, polyfuran, polyaniline, and the like may also include derivatives of polypyrrole, polythiophene, polyfuran, polyaniline, and the like, respectively. For example, polythiophene includes poly (3,4-ethylenedioxythiophene) and the like.

In order to improve electric conductivity of the conductive polymer, various dopants may be added to polymerization liquid for forming a conductive polymer, a conductive polymer solution, or dispersion liquid. The dopant is not particularly limited, but examples of the dopant may include 1,5-naphthalenedisulfonic acid, 1,6-naphthalenedisulfonic acid, 1-octanesulfonic acid, 1-naphthalenesulfonic acid, 2-naphthalenesulfonic acid, 2,6-naphthalenedisulfonic acid, 2,7-naphthalenedisulfonic acid, 2-methyl-5-isopropylbenzenesulfonic acid, 4-octylbenzenesulfonic acid, 4-nitrotoluene-2-sulfonic acid, m-nitrobenzenesulfonic acid, n-octylsulfonic acid, n-butanesulfonic acid, n-hexanesulfonic acid, o-nitrobenzenesulfonic acid, p-ethylbenzenesulfonic acid, trifluoromethanesulfonic acid, hydroxybenzenesulfonic acid, butylnaphthalenesulfonic acid, benzenesulfonic acid, polystyrenesulfonic acid, polyvinylsulfonic acid, and methanesulfonic acid, and derivatives of these dopants. Examples of the derivatives include metal salts such as lithium salts, potassium salts, and sodium salts, ammonium salts such as methylammonium salts, dimethylammonium salts, and trimethylammonium salts, piperidinium salts, pyrrolidinium salts, and pyrrolinium salts.

When the conductive polymer is dispersed in a dispersion medium in a particulate form, average particle diameter D50 of the particle ranges, for example, from 0.01 μm to 0.5 μm, inclusive. When average particle diameter D50 of the particle is within this range, the particles easily enter inside anode body 1.

For example, cathode layer 5 includes carbon layer 5a that is formed so as to cover solid electrolyte layer 4 and metal paste layer 5b that is formed on a surface of carbon layer 5a. Carbon layer 5a contains a conductive carbon material such as graphite and resin. For example, metal paste layer 5b contains a metal particle (for example, silver) and resin. Cathode layer 5, however, is not limited to this configuration. The configuration of cathode layer 5 has only to have a power collection function.

<Anode Lead Terminal>

Anode lead terminal 13 is electrically connected to anode body 1 via second portion 2b of anode wire 2. A material for anode lead terminal 13 is not particularly limited as long as the material is electrochemically and chemically stable and has electric conductivity. For example, anode lead terminal 13 may be metal such as copper or nonmetal. A shape of anode lead terminal 13 is not particularly limited as long as the shape is a flat plate. A thickness of anode lead terminal 13 (distance between main surfaces of anode lead terminal 13) may range from 25 μm to 200 μm, inclusive, or may range from 25 μm to 100 μm, inclusive, from a viewpoint of having a low height.

Anode lead terminal 13 may be joined with anode wire 2 via a conductive adhesive material or solder or may be joined with anode wire 2 by resistance welding or laser welding. The conductive adhesive material is, for example, a mixture of a thermosetting resin described later and carbon particles or metal particles.

<Cathode Lead Terminal>

Cathode lead terminal 14 is electrically connected to cathode part 7 in joint part 14a. Joint part 14a is a portion that overlaps with cathode layer 5 of cathode lead terminal 14 when cathode layer 5 and cathode lead terminal 14 joined with cathode layer 5 are viewed from a direction perpendicular to cathode layer 5.

Cathode lead terminal 14 is joined with cathode layer 5 via, for example, conductive adhesive material 8 described above. One end of cathode lead terminal 14 forms, for example, a part of joint part 14a, and is disposed inside resin outer package 11. Another end of cathode lead terminal 14 is led out to an outside from leading surface 11X of resin outer package 11. Therefore, a part including the other end of cathode lead terminal 14 is exposed from resin outer package 11.

A material for cathode lead terminal 14 is not particularly limited as long as the material is electrochemically and chemically stable and has electric conductivity. For example, cathode lead terminal 14 may be metal such as copper or nonmetal. A shape of cathode lead terminal 14 is not particularly limited as long as the shape is a long and flat plate. Thickness T of cathode lead terminal 14 may range from 25 μm to 200 μm, inclusive, or may range from 25 μm to 100 μm, inclusive, from a viewpoint of having a low height.

On a first main surface in joint part 14a of cathode lead terminal 14, a recess is formed. In at least one cross-section cutting the recess and being perpendicular to the first main surface, maximum width $D_{max}$ inside the recess is larger than opening width D1 of a first opening formed on the first main surface by the recess (D1<$D_{max}$). As a result, interfacial peeling between the first main surface and cathode part 7 facing the first main surface and interfacial peeling between the first main surface and resin outer package 11 is sufficiently suppressed.

Figure 2A:
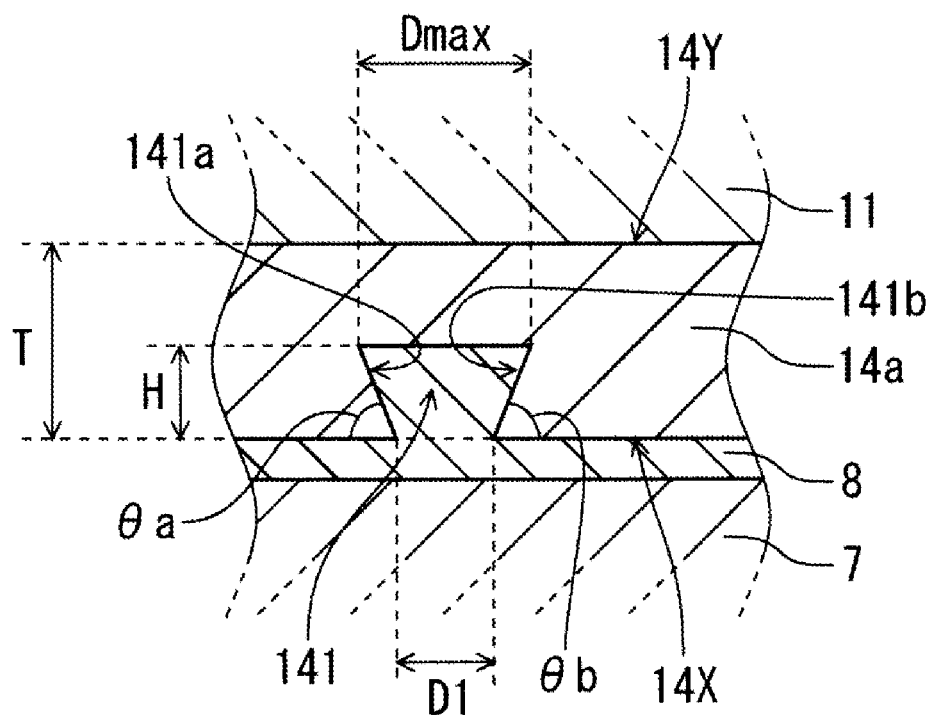
FIG. 2A is an enlarged sectional view schematically illustrating a part of a joint part of a cathode lead terminal according to one exemplary embodiment of the present disclosure.
Figure 2B:
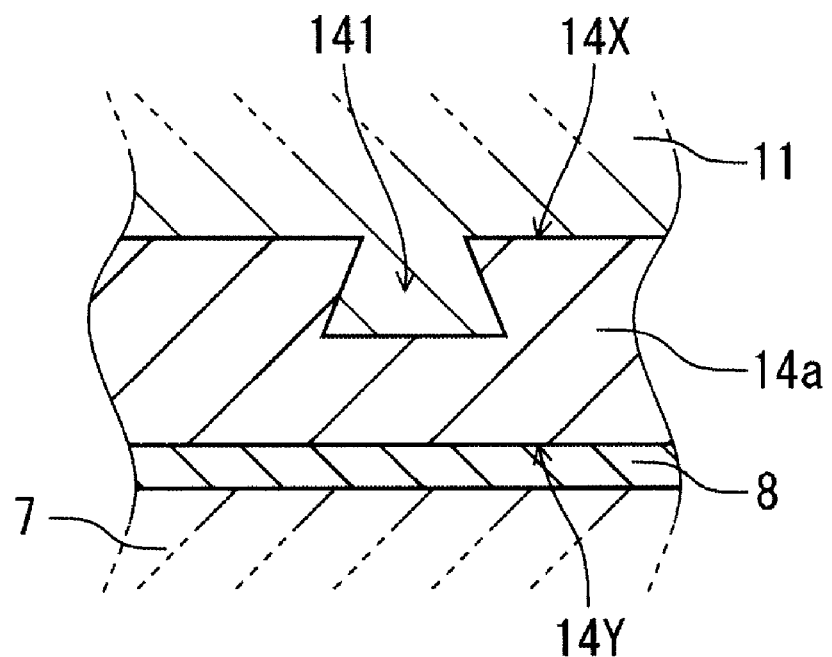
FIG. 2B is an enlarged sectional view schematically illustrating a part of a joint part of another cathode lead terminal according to one exemplary embodiment of the present disclosure.
Figure 2C:
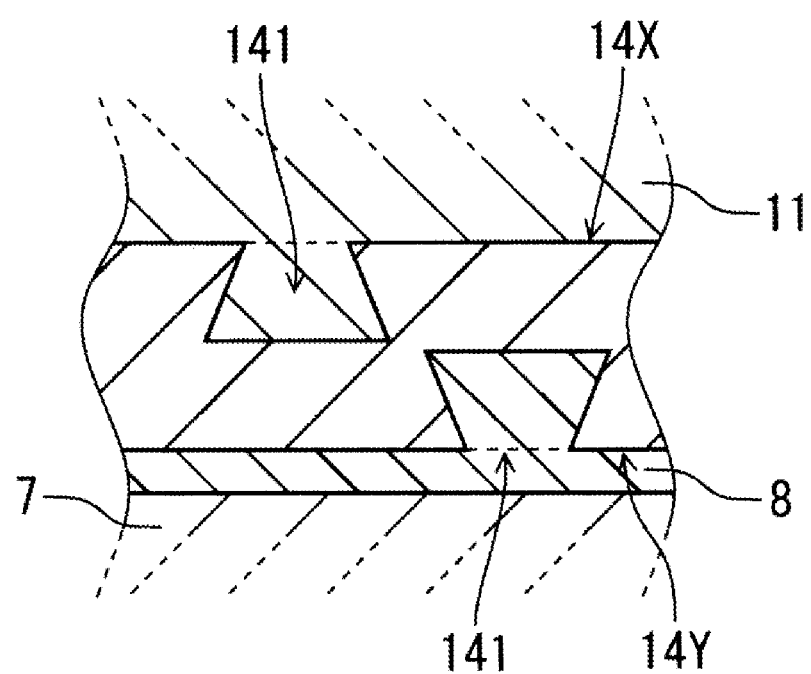
FIG. 2C is an enlarged sectional view schematically illustrating a part of a joint part of still another cathode lead terminal according to one exemplary embodiment of the present disclosure.

The recess is described in detail with reference to FIGS. 2A to 2C. FIG. 2A is an enlarged sectional view schematically illustrating a part of joint part 14a of cathode lead terminal 14. In this figure, first main surface 14X and recess 141 face cathode part 7 via conductive adhesive material 8. FIG. 2B is an enlarged sectional view schematically illustrating a part of joint part 14a. In this figure, first main surface 14X and recess 141 face resin outer package 11. FIG. 2C is an enlarged sectional view schematically illustrating a part of part 14a. In this figure, and recess 141 is formed on both of first main surface 14X and second main surface 14Y.

Maximum width $D_{max}$ of recess 141 inside recess 141 is larger than opening width D1 of the first opening at first main surface 14X (D1<$D_{max}$). The first opening is formed by recess 141. Here, opening width D1 and maximum width $D_{max}$ are compared with each other in one arbitrary cross-section A which cuts the recess and is perpendicular to the first main surface. In other words, the relation D1≥$D_{max}$ may be satisfied when a cross-section at which opening width D1 of the first opening is measured is different from a cross-section at which maximum width $D_{max}$ is measured. Moreover, D1<$D_{max}$ has only to be satisfied when a comparison between D1 and $D_{max}$ is made in one arbitrary cross-section A, and D1≥$D_{max}$ may also be satisfied when a comparison between D1 and $D_{max}$ is made in another cross-section B. This means that recess 141 includes at least one cross-section that satisfies D1<$D_{max}$ (in the above case, cross-section A).

Recess 141 may include first side surface region 141a and second side surface region 141b which are configured so that a width of recess 141 within recess 141 in cross-section A increases from first main surface 14X toward second main surface 14Y. First side surface region 141a and second side surface region 141b faces each other. In this way, side surfaces of recess 141 that face each other are both inclined so that a taper from the second main surface toward the first main surface is formed. As a result, regardless of a direction of a stress applied on joint part 14a, interfacial peeling is easily suppressed.

Smaller angle θa formed by first side surface region 141a and first main surface 14X may be 30°≤θa≤90°, or may be 45°≤θa≤90°. Smaller angle θb formed by second side surface region 141b and first main surface 14X may be 30°≤θb≤90°, or may be 45°≤θb≤90°. Angles θa and θb may be same or different.

Note that recess 141 may include a portion having a width equal to or less than opening width D1 or less in cross-section A. For example, in cross-section A, recess 141 may include a side surface region other than first side surface region 141a and second side surface region 141b. From the viewpoint of workability, however, it is preferable that the width of recess 141 inside recess 141 continuously or gradually increases from first main surface 14X toward second main surface 14Y. A bottom of recess 141 may be flat or have a curved surface.

Opening width D1 is a length of the first opening in cross-section A. Maximum width $D_{max}$ is, in same cross-section A, a maximum value of a length in a direction parallel to first main surface 14X of recess 141.

$D_{max}$/D1, which is a ratio of maximum width $D_{max}$ to opening width D1 of the first opening, is not particularly limited as long as the ratio is larger than 1. For example, the ratio may range from 1.1 to 3, inclusive, or may range from 1.2 to 2, inclusive. Opening width D1 may range, for example, from 100 μm to 2000 μm, inclusive, or may range from 200 μm to 500 μm, inclusive. Maximum width $D_{max}$ may range, for example, from 110 μm to 3000 μm, inclusive, or may range from 220 μm to 1500 μm, inclusive.

Depth H of recess 141 is not particularly limited as long as the depth is smaller than thickness T of cathode lead terminal 14. From the viewpoint of strength, it is preferable that depth H of recess 141 range from 10% to 90%, inclusive, of thickness T, or may range from 20% to 50%, inclusive. Depth H of recess 141 is defined as a shortest distance from a portion of recess 141 closest to second main surface 14Y to the first opening (or first main surface 14X).

The shape of the first opening viewed from a direction perpendicular to first main surface 14X is not particularly limited, and may be a dot shape or a slit shape. From the viewpoint of improving an effect of suppressing interfacial peeling, the first opening may have a slit shape. In this case, in a cross-section crossing in a longitudinal direction of the first opening, D1<$D_{max}$ is satisfied.

The dot shape is defined as a shape in which, when a minimum rectangular shape enclosing the first opening is assumed, the ratio of length of an arbitrary side of the rectangular shape to a side perpendicular to the arbitrary side while sharing an apex with the arbitrary side is less than or equal to 2. The slit shape is defined as a shape in which the ratio of length described above is over 2. An outer shape of the dot is not particularly limited, and may be a circular shape (including a substantially circular shape and an ellipse), a rectangular shape, and other polygons. When the outer shape of the dot is a circular shape, opening width D1 and maximum width $D_{max}$ correspond an opening diameter and a maximum diameter of the circular shape, respectively. From the viewpoint of easy forming of recess 141, it is preferable that the outer shape of the dot is a circular shape. The outer shape of the slit is not particularly limited, and may be a straight line, may be a curved line, or may be a shape including a straight line and a curved line. The longitudinal direction of the first opening is defined as a direction indicated by a longer straight line that connects a center of one end of the first opening to a center of another end.

When the first opening has a slit shape, the longitudinal direction of the first opening may intersect with an extending direction of cathode lead terminal 14. The extending direction of cathode lead terminal 14 is defined as a direction, on first main surface 14X, extending from joint part 14a (specifically, for example, one end of cathode lead terminal 14) toward leading surface 11X of resin outer package 11 from which cathode lead terminal 14 starts being exposed.

Normally, an exposed portion of cathode lead terminal 14 is bent along leading surface 11X at least one of inside and outside resin outer package 11. Hence, a stress for pulling cathode lead terminal 14 in the extending direction and separating cathode lead terminal 14 from cathode part 7 or resin outer package 11 is easily applied in joint part 14a.

Thus, by forming of the first opening having a slit shape in a direction intersecting with the extending direction of cathode lead terminal 14, power of resistance against the stress described above increases and interfacial peeling is more easily suppressed. An angle formed by the longitudinal direction of the first opening and the extending direction of cathode lead terminal 14 may be 90°, and smaller angle θ formed by the longitudinal direction of the first opening and the extending direction of cathode lead terminal 14 may be 45°>θ≤90°.

At least one recess 141 is formed on first main surface 14X in joint part 14a. From the viewpoint of increasing an anchor effect, it is preferable that a plurality of recesses 141 are formed on first main surface 14X in joint part 14a. In this case, recesses 141 each having a slit shape may be formed parallel to each other, may be formed so as to intersect with each other, or may be randomly formed. Recesses 141 each having a dot shape may be formed at equal intervals, or may be randomly formed. Moreover, as shown in FIG. 2C, recess 141 may be further formed on second main surface 14Y in addition to first main surface 14X. At this time, from the viewpoint of maintaining the strength, it is preferable that recess 141 formed on first main surface 14X and recess 141 formed on second main surface 14Y are disposed so as not to overlap each other when viewed from the direction perpendicular to first main surface 14X.

From the viewpoint of increasing the effect of suppressing interfacial peeling, it is preferable that an area ratio of the first opening (a total area ratio when a plurality of first openings exists) to the area of the first main surface ranges from 5% to 50%, inclusive, or may range from 10% to 20%, inclusive.

As shown in FIG. 2A, when first main surface 14X and recess 141 face cathode part 7, for example, a part of conductive adhesive material 8 enters inside recess 141 to cause the anchor effect. As a result, interfacial peeling between cathode lead terminal 14 and cathode part 7 is suppressed. On the other hand, as shown in FIG. 2B, when first main surface 14X faces resin outer package 11, a part of resin outer package 11 enters inside recess 141 to cause the anchor effect. As a result, interfacial peeling between cathode lead terminal 14 and resin outer package 11 is suppressed. As shown in FIG. 2C, in the same manner, when recesses 141 are formed on first main surface 14X and second main surface 14Y, the interfacial peeling between cathode lead terminal 14 and cathode part 7, and the interfacial peeling between cathode lead terminal 14 and resin outer package 11 are suppressed. From the viewpoint of further suppressing the interfacial peeling between cathode lead terminal 14 and resin outer package 11, recess 141 may be further formed in an area other than joint part 14a of cathode lead terminal 14 in addition to joint part 14a.

<Resin Outer Package>

Resin outer package 11 is provided for electrically insulating anode lead terminal 13 from cathode lead terminal 14, and made of an insulating material. Resin outer package 11, for example, includes a cured product of thermosetting resin. Examples of the thermosetting resin include epoxy resin, phenol resin, silicone resin, melamine resin, urea resin, alkyd resin, polyurethane, polyimide, and unsaturated polyester.

One example of a method for producing the electrolytic capacitor according to the present exemplary embodiment is described.

<<Method for Producing Electrolytic Capacitor>>

(1) Step of Producing Anode Body

Valve metal particles and anode wire 2 are put in a die such that first portion 2a is embedded in the valve metal particles, compression-molded, then sintered in a vacuum to prepare anode body 1 in which first portion 2a is embedded inside a porous sintered body from one surface of the porous sintered body. Pressure during compression-molding is not particularly limited, and is, for example, approximately 10 N to 100 N. The valve metal particles may be mixed with a binder such as polyacrylic carbonate as necessary.

(2) Step of Forming Dielectric Layer

On anode body 1, dielectric layer 3 is formed. Specifically, anode body 1 is immersed in an anodizing tank filled with an electrolyte solution (e.g., phosphoric acid aqueous solution) and second portion 2b of anode wire 2 is connected to the anode body in the anodizing tank to perform anodization. As a result, dielectric layer 3 constituted by an oxide film of the valve metal can be formed on a surface of anode body 1. As the electrolyte solution, not only the phosphoric acid aqueous solution but also, for example, nitric acid, acetic acid, and sulfuric acid can be used.

(3) Step of Forming Solid Electrolyte Layer

In the present exemplary embodiment, a step of forming solid electrolyte layer 4 including a conductive polymer is described. Solid electrolyte layer 4 containing a conductive polymer is formed on at least part of dielectric layer 3, for example, by a method of impregnating anode body 1 on which dielectric layer 3 is formed with a monomer or an oligomer, and then polymerizing the monomer or the oligomer by chemical polymerization or electrolytic polymerization. Alternatively, solid electrolyte layer 4 containing a conductive polymer may be formed by a method of impregnating anode body 1 on which dielectric layer 3 is formed with a solution of a conductive polymer or dispersion liquid, and drying the solution or the liquid.

(4) Step of Forming Cathode Layer

Cathode layer 5 constituted by carbon layer 5a and metal paste layer 5b is formed through sequential application of a carbon paste and a metal paste on a surface of solid electrolyte layer 4. A configuration of cathode layer 5 is not limited to this, and the cathode layer has only to have a power collection function.

With the method described above, capacitor element 10 is manufactured.

(5) Step of Joining Anode Lead Terminal

One end of anode wire 2 planted from anode body 1 is joined with anode lead terminal 13 by laser welding, resistance welding, or the like.

(6) Step of Preparing and Joining Cathode Lead Terminal

Recess 141 is formed in a precursor of cathode lead terminal 14. Recess 141 is formed, for example, as described below.

First, a press die including a protrusion having a cylindrical or prismatic shape is pressed in a predetermined position of the precursor to form a recess corresponding to the protrusion described above on at least one main surface of the precursor. Next, using a press plate having a flat plate shape, a main surface on which the recess described above of the precursor is formed is pressed. In this way, a portion close to the opening formed by the recess is crushed inside the recess and recess 141 whose opening is narrower than the inside of the recess is formed.

After application of conductive adhesive material 8 to cathode layer 5, cathode lead terminal 14 including recess 141 is joined with cathode part 7 via conductive adhesive material 8. At this time, the main surface on which recess 141 is formed may be joined with cathode part 7, or a main surface on an opposite side may be joined with cathode part 7.

(7) Step of Sealing Capacitor Element

Capacitor element 10 to which anode lead terminal 13 and cathode lead terminal 14 are connected and a resin (a material of resin outer package 11: for example, an uncured thermosetting resin and filler) are accommodated in a die. Subsequently, capacitor element 10 is sealed with resin outer package 11 by a transfer molding method, a compression molding method, or the like. At this time, a part of anode lead terminal 13 and a part of cathode lead terminal 14 are led out from the die. Conditions of molding are not particularly limited. In consideration of a temperature for curing the thermosetting resin to be used, or the like, time and temperature conditions should be set as necessary.

The electrolytic capacitor according to the present disclosure excels in suppression of an increase in an ESR and thus is applicable to various applications.

What is claimed is:

1. An electrolytic capacitor comprising:
    a capacitor element including an anode part and a cathode part;
    an anode lead terminal electrically connected to the anode part;
    a cathode lead terminal electrically connected to the cathode part, the cathode lead terminal having a first main surface and a second main surface opposite to the first main surface; and
    a resin outer package covering the capacitor element, the resin outer package exposing at least a part of the anode lead terminal and at least a part of the cathode lead terminal, wherein:
    the cathode lead terminal includes a joint part to be joined with the cathode part,
    the joint part has a recess on the first main surface,
    in at least one cross-section cutting the recess and being perpendicular to the first main surface, a relation $D1 < D_{max}$ is satisfied, where D1 represents an opening width of a first opening at the first main surface of the recess, and $D_{max}$ represents a maximum width of the recess inside the recess, and
    in the at least one cross-section, a width of the recess increases from the first main surface toward the second main surface to be the maximum width $D_{max}$ at a bottom of the recess.

2. The electrolytic capacitor according to claim 1, wherein:
    the recess has a first side surface region and a second side surface region facing the first side surface region, and
    the first side surface region and the second side surface region are configured so that a width of the recess inside the recess in the at least one cross-section increases from the first main surface toward the second main surface.

3. The electrolytic capacitor according to claim 1, wherein the first main surface of the joint part faces the cathode part.

4. The electrolytic capacitor according to claim 1, wherein the second main surface of the joint part faces the cathode part.

5. The electrolytic capacitor according to claim 1, wherein the first opening viewed from a direction perpendicular to the first main surface has a dot shape.

6. The electrolytic capacitor according to claim 1, wherein:
the first opening viewed from a direction perpendicular to the first main surface has a slit shape, and
the at least one cross-section intersects with a longitudinal direction of the slit shape.

* * * * *